(12) United States Patent
Kanojia et al.

(10) Patent No.: US 10,154,294 B2
(45) Date of Patent: *Dec. 11, 2018

(54) CLOUD BASED LOCATION SHIFTING SERVICE

(71) Applicant: Charter Communications Operating, LLC, St. Louis, MO (US)

(72) Inventors: Chaitanya Kanojia, West Newton, MA (US); Joseph Thaddeus Lipowski, Norwell, MA (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/018,588

(22) Filed: Feb. 8, 2016

(65) Prior Publication Data

US 2016/0156954 A1 Jun. 2, 2016

Related U.S. Application Data

(63) Continuation of application No. 13/399,666, filed on Feb. 17, 2012, now Pat. No. 9,258,575.
(Continued)

(51) Int. Cl.
*H04N 7/173* (2011.01)
*H04W 4/00* (2018.01)
(Continued)

(52) U.S. Cl.
CPC ..... *H04N 21/2541* (2013.01); *H04N 21/2181* (2013.01); *H04N 21/2187* (2013.01); *H04N 21/222* (2013.01); *H04N 21/25841* (2013.01); *H04N 21/2668* (2013.01); *H04N 21/2747* (2013.01); *H04N 21/4627* (2013.01); *H04N 21/47202* (2013.01); *H04N 21/6125* (2013.01)

(58) Field of Classification Search
None
See application file for complete search history.

(56) References Cited

U.S. PATENT DOCUMENTS

| 4,721,960 A | 1/1988 | Lait |
| 6,340,948 B1 | 1/2002 | Munoz-Garcia et al. |

(Continued)

FOREIGN PATENT DOCUMENTS

| EP | 1895777 | 3/2008 |
| JP | 2004007592 | 1/2004 |

(Continued)

OTHER PUBLICATIONS

International Search Report, dated May 3, 2012, from International Application No. PCT/US2011/061232, filed Nov. 17, 2011.
(Continued)

*Primary Examiner* — William J Kim
(74) *Attorney, Agent, or Firm* — Dunlap Codding, P.C.

(57) ABSTRACT

A method and system for enabling a user to access video capture services from a home market while temporarily located in outside of it, i.e., roaming. The user temporarily located outside of their home market uses a regional system as a proxy in a home market in which the user is able to receive regional content. The regional system transfers the regional content to the roaming user.

10 Claims, 12 Drawing Sheets

Related U.S. Application Data

(60) Provisional application No. 61/444,415, filed on Feb. 18, 2011.

(51) Int. Cl.

| | | |
|---|---|---|
| *H04N 21/254* | (2011.01) | |
| *H04N 21/218* | (2011.01) | |
| *H04N 21/2187* | (2011.01) | |
| *H04N 21/222* | (2011.01) | |
| *H04N 21/258* | (2011.01) | |
| *H04N 21/2668* | (2011.01) | |
| *H04N 21/2747* | (2011.01) | |
| *H04N 21/472* | (2011.01) | |
| *H04N 21/61* | (2011.01) | |
| *H04N 21/4627* | (2011.01) | |

(56) References Cited

U.S. PATENT DOCUMENTS

| | | |
|---|---|---|
| 6,754,907 B1 | 6/2004 | Schumacher et al. |
| 6,871,081 B1 * | 3/2005 | Llewellyn ........... H04W 88/085 343/770 |
| 6,889,385 B1 | 5/2005 | Rakib et al. |
| 7,130,576 B1 | 10/2006 | Gurantz et al. |
| 7,725,912 B2 | 5/2010 | Margulis |
| 7,741,997 B1 | 6/2010 | Jacomb-Hood |
| 7,813,766 B1 | 10/2010 | Lam |
| 2002/0031224 A1 | 3/2002 | Basawapatna et al. |
| 2003/0139980 A1 | 7/2003 | Hamilton |
| 2003/0158913 A1 | 8/2003 | Agnoli et al. |
| 2003/0192054 A1 * | 10/2003 | Birks ................. H04N 7/17336 725/100 |
| 2003/0233580 A1 * | 12/2003 | Keeler ................. G06Q 20/206 726/7 |
| 2004/0117834 A1 | 6/2004 | Karaoguz et al. |
| 2004/0117846 A1 | 6/2004 | Karaguz et al. |
| 2004/0154040 A1 | 8/2004 | Ellis |
| 2004/0193648 A1 | 9/2004 | Lai et al. |
| 2005/0022242 A1 | 1/2005 | Rosetti et al. |
| 2005/0076375 A1 | 4/2005 | Nakamura |
| 2006/0080703 A1 | 4/2006 | Compton |
| 2006/0259927 A1 | 11/2006 | Acharya et al. |
| 2007/0240192 A1 | 10/2007 | Acharya et al. |
| 2007/0276926 A1 | 11/2007 | LaJoie et al. |
| 2008/0059533 A1 | 3/2008 | Krikorian |
| 2008/0060035 A1 * | 3/2008 | Tsang ...................... H04L 12/18 725/109 |
| 2008/0129864 A1 | 6/2008 | Stone et al. |
| 2008/0301750 A1 | 12/2008 | Silfvast et al. |
| 2009/0007190 A1 | 1/2009 | Weber et al. |
| 2009/0113492 A1 | 4/2009 | Norin et al. |
| 2009/0172685 A1 | 7/2009 | Shavit |
| 2009/0222875 A1 | 9/2009 | Cheng et al. |
| 2009/0317065 A1 | 12/2009 | Fyock et al. |
| 2010/0064053 A1 | 3/2010 | Bull et al. |
| 2010/0125888 A1 | 5/2010 | Jerram |
| 2010/0281042 A1 | 11/2010 | Windes et al. |
| 2010/0319044 A1 | 12/2010 | Agans et al. |
| 2011/0213856 A1 * | 9/2011 | Moroney ................ G06F 21/10 709/217 |
| 2013/0273974 A1 | 10/2013 | Lea et al. |

FOREIGN PATENT DOCUMENTS

| | | |
|---|---|---|
| JP | 2010273298 | 12/2010 |
| WO | WO2006014739 | 2/2006 |
| WO | WO2006107350 | 10/2006 |
| WO | WO2007064380 | 6/2007 |
| WO | WO2009071132 | 6/2009 |
| WO | WO2010030627 | 3/2010 |

OTHER PUBLICATIONS

International Search Report, dated Aug. 7, 2012, from International Application No. PCT/US2012/025676, filed Feb. 17, 2012.

Boudier, T. et al., "VIDOS, a system for video editing and format conversion over the internet," Computer Networks, vol. 34, 2000, pp. 931-944.

Wheeler, H. A., "Fundamental Limitations of Small Antennas," Proceedings of the IRE, vol. 35, Dec. 1947, pp. 1479-1484.

"Apple vs. Google: The Stakes are Rising," The Wall Street Journal, accessed on Feb. 10, 2012.

International Search Report, dated Nov. 2, 2012, from International Application No. PCT/US2012/025707, filed Feb. 17, 2012.

Partial International Search Report, dated Jun. 6, 2012, from International Application No. PCT/US2012/025658, filed Feb. 17, 2012.

SplashCast is Social TV, downloaded from Internet on Sep. 6, 2011.

International Preliminary Report on Patentability and the Written Opinion of the International Searching Authority dated Aug. 29, 2013, from counterpart International Application No. PCT/US2012/025676, filed on Feb. 17, 2012.

\* cited by examiner

Broadcast file store 126

| USER ID | CONTENT ID | ANTENNA ID | NETWORK ID | VIDEO FILE | FILE ID | TIME / DATE |
|---|---|---|---|---|---|---|
| User 1 | TV Show 1 | Antenna 1 | NBC | File pointer | Episode123 | 10am / 10-22-10 |
| User 2 | TV Show 1 | Antenna 2 | NBC | File pointer | Episode123 | 10am / 10-22-10 |
| User 3 | TV Show 2 | Antenna n | CBS | File pointer | Episode456 | 3pm / 12-15-10 |
| ... | ... | ... | ... | ... | ... | ... |
| User - n | TV Show 1 | Antenna 45 | NBC | File pointer | Episode123 | 10am / 10-22-10 |

Fig. 6

CLOUD BASED LOCATION SHIFTING SERVICE

CROSS-REFERENCE TO RELATED APPLICATIONS

The present patent application is a continuation of the patent application filed Feb. 17, 2012, identified by Ser. No. 13/399,666, issuing as U.S. Pat. No. 9,258,575, which claims the benefit under 35 USC 119(e) of U.S. Provisional Application No. 61/444,415, filed on Feb. 18, 2011, which is incorporated herein by reference in its entirety.

BACKGROUND

Over the air television, which is also referred to as terrestrial television or broadcast television, is a distribution mode for television programming via radio waves through the atmosphere. Some examples of well-known major television networks in the United States that broadcast over the air content are ABC, CBS, FOX, NBC, and PBS.

Television networks look for ways to attract new customers and increase viewership. One way that television networks attempt to increase their viewership is by putting their programming online for people to access via the Internet. Typically, the television networks will upload content to their website or some other third party website, such as HULU.COM. The problem for people accessing this online content is that there is limited selection, the most recent episodes are not available, and the content is often outdated.

At the same time, a wide variety of devices are available that can play video content. In addition to the ubiquitous television, many people now watch video on their personal computers and mobile devices, such as smartphones, tablets or slate computers. Video content is usually accessed through the Internet using subscriber data networks, cellular phone networks, and public and private wireless data networks.

SUMMARY OF THE INVENTION

Recently, a system for enabling network access to an antenna array to capture broadcast content transmissions was described in U.S. patent application Ser. No. 13/299, 186, filed on Nov. 17, 2011 by Kanojia and Lipowski, now U.S. Pat. Publ. No. US 2012-0127374, for example, which application is incorporated herein by this reference in its entirety. This system enables users to separately access antenna feeds over a network connection, including the Internet. Each user is assigned their own unique antenna, in some implementations, to record and/or stream content transmissions, e.g. television programs, from over the air broadcasts. As a user selects content transmissions, antenna elements are assigned to capture the broadcast content transmissions, demodulators and decoders process the content transmission data, and then, at the user's request, the system stores the content data to each of the users' accounts separately for later playback by that users and/or streams the content data to the user in real time.

This system generally enables users to capture and record over the air broadcasts within the user's home market for each user. However, users and their video-capable devices are highly mobile. It is common for users to travel around the United States or world with their devices and, while away have access high-speed Internet or mobile cellular networks.

The present system and method, in some examples, allows a user to access content transmissions from their home market when they are not physically present in their home market. The users connect to a central qualifying system that transfers the user requests to access the system to regional capture and distribution systems (regional systems) in the home markets of the users. The regional systems act as geographic proxies for the users in their respective home markets. Content transmission recordings can be set up. Content transmissions are then captured by the regional systems and then possibly, depending on the embodiment, streamed to the users via private and public networks, such as the Internet.

In some examples, an ability of a user to access live streaming content transmissions is disabled when that user is roaming from their home markets. In still other examples, the user located outside their home market is further disabled in their ability to access previously-recorded content transmissions.

In general, according to one aspect, the invention features a method for streaming content originating from the user's home market to a user temporarily located outside the home market. The method includes transferring users to regional capture and distribution systems located within their home market. The method further includes the regional capture and distribution systems capturing the content transmissions from broadcasting entities located within the home market of the user as requested by the users. The regional capture and distribution systems then transfer the requested content transmissions to the users.

In general, according to another aspect, the invention features a national system for streaming content to users. The system includes regional systems for capturing and distributing requested content transmissions to a user from the home market associated with the user. The system further includes a qualifying system that determines the home market for each user. The qualifying system then passes the user to the regional systems covering the corresponding home market of the user.

In embodiments, the geographical location of the user is determined to assess whether the user is located outside of the home market. Techniques for location determination include accessing a global positioning system, accessing cellular phone systems, or looking up Internet protocol addresses assigned to the user in an address geographical location directory.

In other aspects of the embodiments, the regional capture and distribution systems are nodes of a content delivery network, which are connected via dedicated links that transfer data between the regional capture and distribution systems. These dedicated links can be used to transfer the user requested content transmissions to local regional capture and distribution systems that are near the roaming user and these local regional capture and distribution systems then stream the user requested content transmissions to the user.

In general, according to another aspect, the invention features a method for managing capture and distribution of content transmissions originating from a home market. This method comprises determining whether the users are physically located within their respective home markets and for the user located outside their home market, disabling an ability of the user to access live streaming content transmissions.

In embodiments, for the user located outside their home market, an ability of the users to access previously-recorded content transmissions is further disabled.

In general, according to another aspect, the invention features a system for managing the capture and distribution of content transmissions. The system comprises a system, such as a central qualifying system, that determines whether the user is physically located within their home market and regional systems that disable an ability of the user to access live streaming content transmissions for users located outside their respective home markets.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 6 illustrates the database architecture for storing content data from content transmissions in the broadcast file store of the regional systems.

DETAILED DESCRIPTION OF THE PREFERRED EMBODIMENTS

Figure 1:
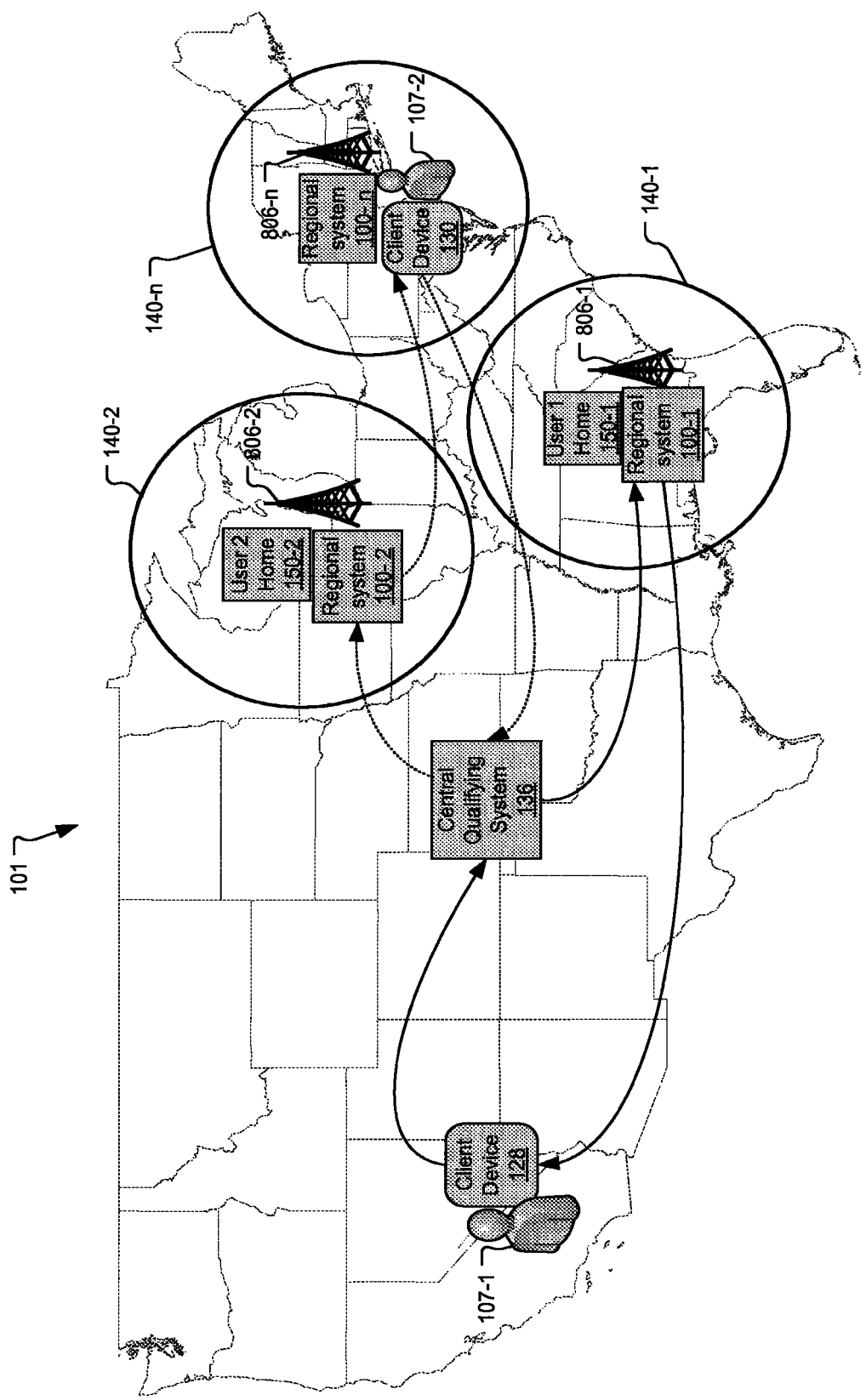
FIG. 1 is a schematic diagram illustrating the relationship between the users, the central qualifying system, and the regional systems of a national system.

FIG. 1 is a block diagram illustrating the relationships between the users 107-1 to 107-$n$, the central qualifying system 136, and the regional systems 100-1, 100-2 ... 100-$n$ of the national system 101 for capturing and delivering streaming video to the users.

Users 107-1 to 107-$n$ send requests to the central qualifying system 136 with client devices 128, 130. The client devices are generally personal or mobile computing devices, usually with web browsing capabilities, that can access video and content over a network connection, such as the Internet. In examples, the client devices are personal computers that access the system 100. The video content is displayed on the personal computers using HTML-5 or a program such as QuickTime by Apple Corporation. In other examples, the central qualifying system 136 is accessed by mobile computing devices 128, 130 such as tablet or slate computers or smartphone computing devices. Typically, the client devices 128, 130 access the central qualifying system 136 via a browser or a proprietary software application installed on the client devices.

Markets 140-1 to 140-$n$ are geographic regions that are typically associated with metropolitan areas around major cities. Each user is assigned or selects their home market and home market to which each user is assigned is generally determined by their legal residence (e.g. residential addresses) 150-1, 150-2. While only three markets 140-1, 140-2, 140-$n$ are shown in the figure, additional markets would typically cover other regions around the United States or other country, and possibly the world.

Within the markets 140-1 to 140-$n$ are broadcasting entities 806-1 to 806-$n$ that transmit over the air broadcasts. The broadcasting entities 806-1 to 806-$n$ are typically network television stations that transmit the over the air broadcasts from transmission towers within a metropolitan area.

After receiving the user requests to access the system, the central qualifying system 136 directs the user requests to access the system to the regional systems 100-1 to 100-$n$ located in the different markets 140-1 to 140-$n$ of the users. Each regional system 100-1 to 100-$n$ includes at least one content transmission capture and distribution system as described in, for example, U.S. patent application Ser. No. 13/299,186, filed on Nov. 17, 2011 by Kanojia and Lipowski, now U.S. Pat. Publ. No. US 2012-0127374. The regional systems 100-1 to 100-$n$ provide a physical presence in the home markets of each of the users and enable users to capture and encode over the air broadcast content transmitted by the broadcasting entities 806-1 to 806-$n$ and then stream the encoded content transmission to the users via the Internet and/or other network.

In some instances, users (see 107-2) may roam from their respective home market and enter other markets covered by other regional systems. Additionally, some users (see 107-1) may roam from their home market into areas of the country (or world) that are outside any of the regional markets covered by the system 101. In each of these scenarios, the regional systems 100-1 to 100-$n$ in their home markets becomes geographic proxies for the users when they are temporarily located outside of their home market.

Figure 2:
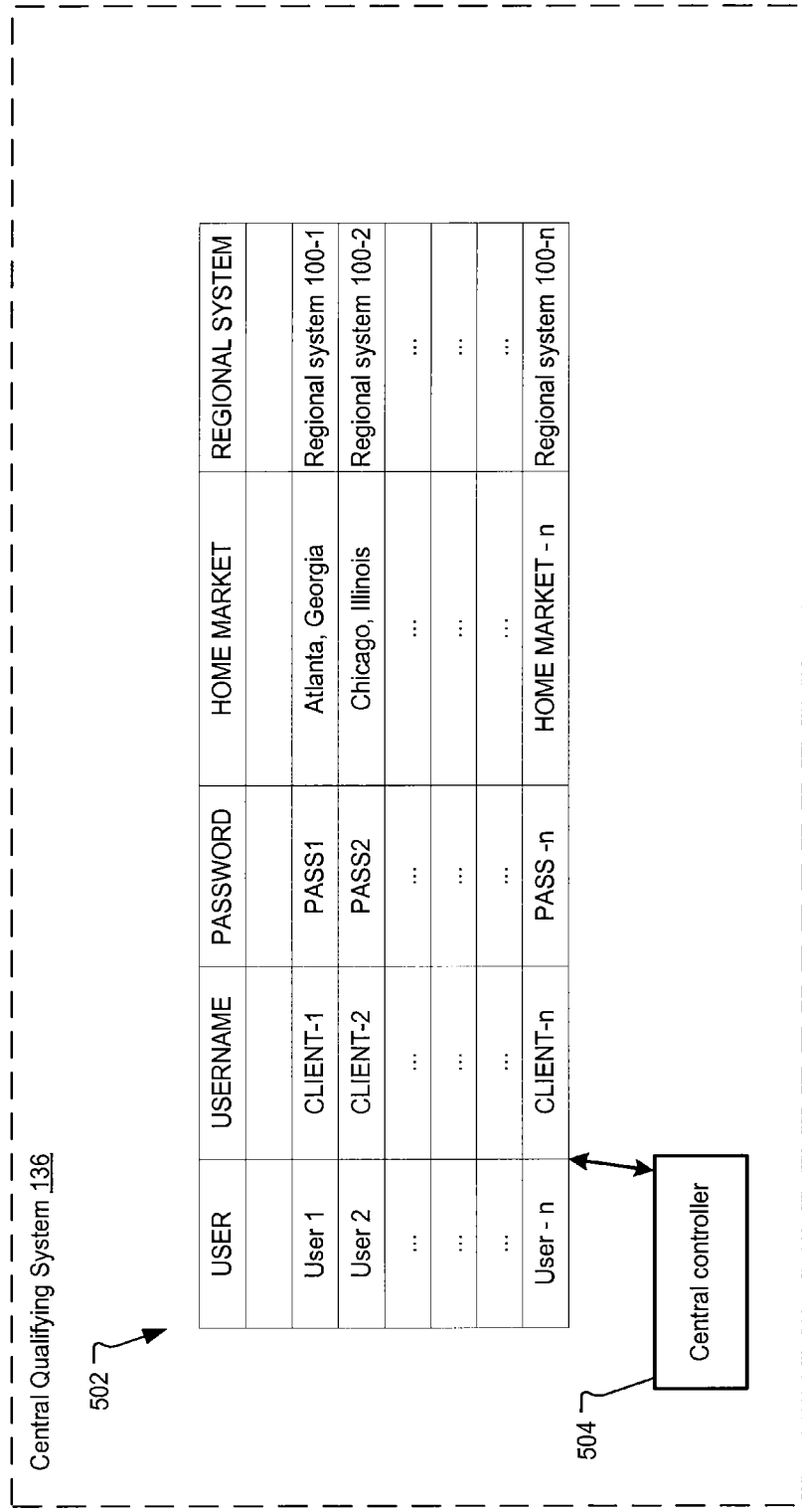
FIG. 2 illustrates a central qualifying system and the database architecture of a central qualifying system database.

FIG. 2 shows the central qualifying system 136 and the architecture of a central qualifying system database 502.

The central qualifying system database 502 stores user account information such as personal information, usernames, passwords, home markets, and regional systems for the users. In the illustrated example, the USER field includes personal information such as the user's name, home address, home and/or mobile phone number, and email address, to list a few examples. The USERNAME and PASSWORD fields contain the usernames and passwords required for authenticating the users. While the illustrated example shows the passwords saved as standard text, the passwords are generally encrypted for security. The HOME MARKET field generally identifies a city or metropolitan area that is the home markets of each of the users. The REGIONAL SYSTEM field identifies the particular the regional system that is in the home markets of the users, and which the user typically accesses.

The central qualifying system 136 further includes a central controller 504 that directs the user requests to the regional systems 100-1 to 100-n in the home markets of the users based on the records in the central qualifying system database 502. Additionally, the central controller 504 enables users (or system administrators) to edit, view, and/or remove information in the records in the database 502.

Figure 3:
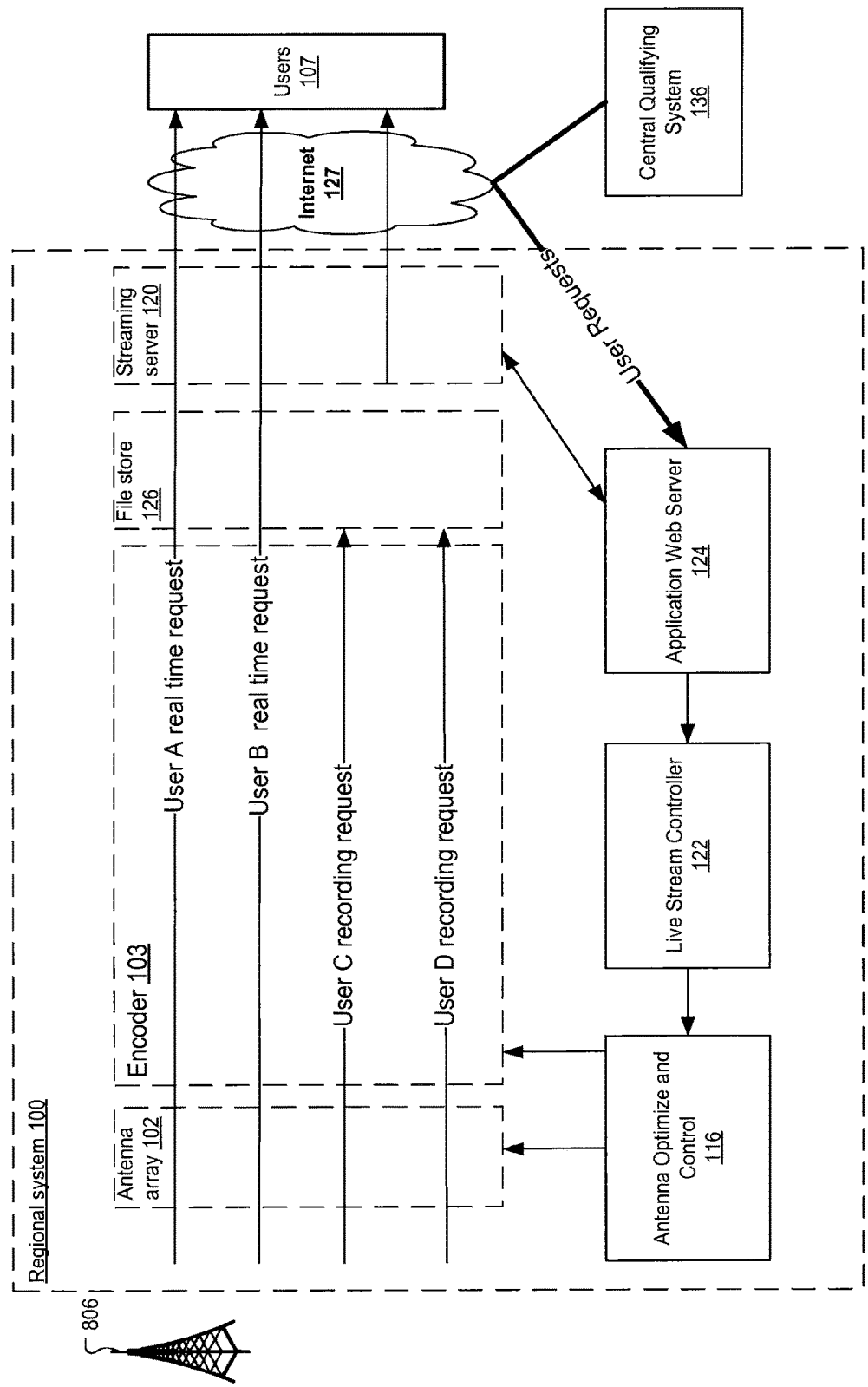
FIG. 3 is a block diagram illustrating how user requests for content transmissions are captured and encoded by the regional systems.

FIG. 3 is a high level block diagram illustrating how content transmissions are captured and encoded by the regional systems 100-1 to 100-n in response to the requests from users.

In a typical implementation, the user requests are transferred from the central qualifying system 136 to the regional system 100 via the Internet 127. The user requests to access the system are handled by an application web server 124. The application web server 124 allows the users to select whether they want to watch or access previously-recorded content, schedule a future recording of an over the air broadcast, or watch a live over the air broadcast. If the user requests previously record content, then the application web server 124 transfers the request to the streaming server 120. The streaming server retrieves the user's copy of the previously-recorded content and streams it to the user. If the user requests a future recording or to watch a live over the air broadcast, then the application server 124 notifies a live stream controller 122. The live stream controller 122 instructs the antenna optimization and control system 116 to configure broadcast capture resources to capture, encode, store, and stream the user requested content.

In the illustrated example, users A and B both requested live streaming of over the air broadcasts. Therefore, the capturing, encoding and streaming of the requested content are performed in real time. The requested over the air broadcast from the broadcasting entity 806 is captured by the antenna or antenna array 102. Then the encoder system 103 encodes the captured content transmission to content data in real time. Next, the content transmission data are typically buffered and stored in the file store 126. The streaming server 120 then streams the content data from the file store 126 to the users 107.

User C scheduled a future recording of an over the air broadcast. At the time of the broadcast, the antenna array 102 captures the over the air broadcast. The encoder system 103 then encodes the captured content transmission to content data. Next, the content data are transferred to the file store 126 either directly or through a buffer. Later, when the users 107 request to view their previous recorded content, the application server 124 transfer the request to the streaming server 120, which streams the requested content to the users 107 as content data.

User D also scheduled a future recording of an over the air broadcast. At the time of the broadcast, the antenna array 102 captures the over the air broadcast. The content data are then generated by the encoder system 103 and transferred to the file store 126 until accessed by the users 107.

Figure 4A:
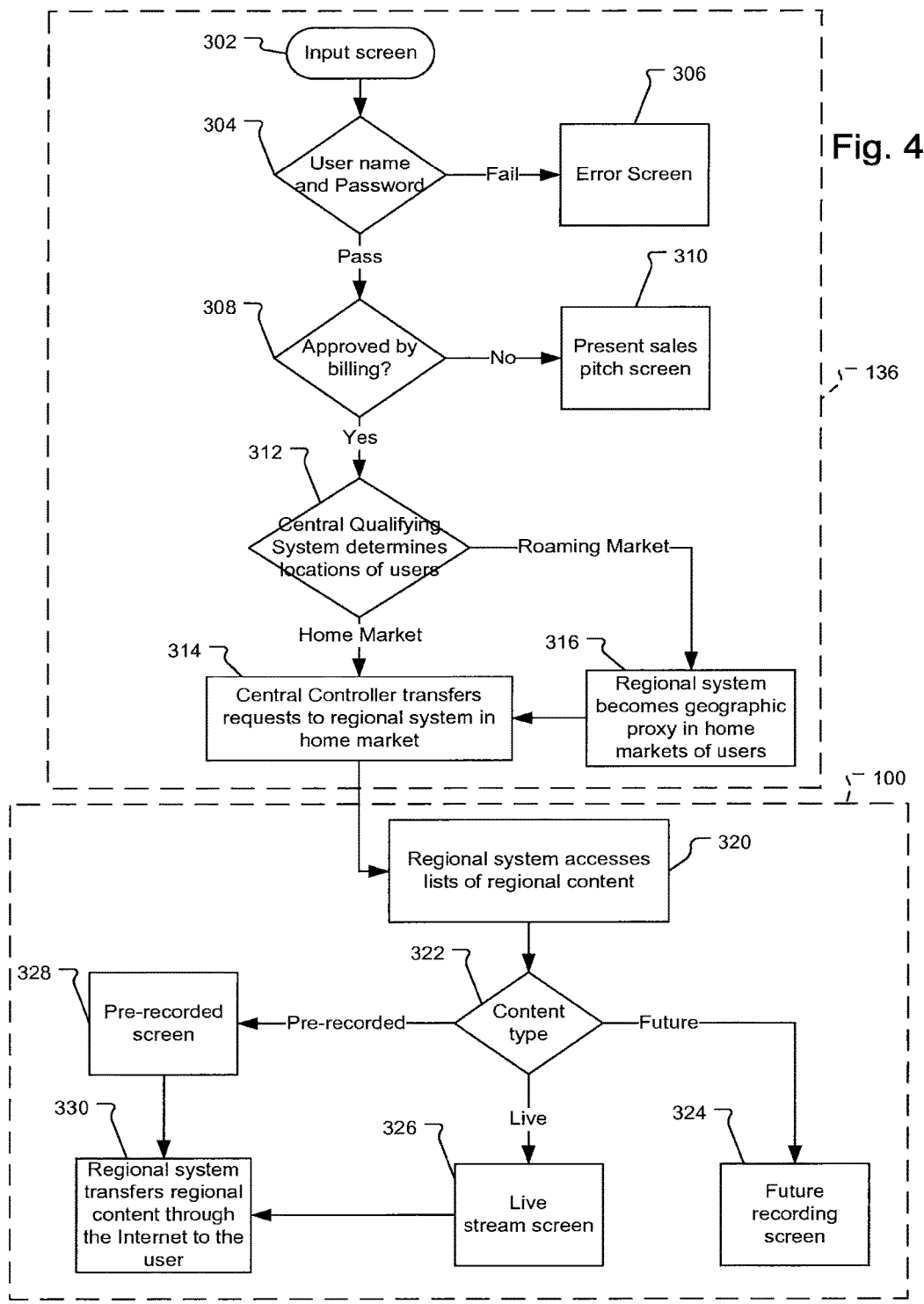
FIG. 4A is a flow diagram illustrating the steps performed by the central qualifying system and regional systems to enable users to view live streaming content, set up a future recording, or view previously-recorded content.

FIG. 4A is a flow diagram illustrating the steps performed by the central qualifying system 136 and regional systems 100-1 to 100-n to enable users to view live streaming content, set up a future recording, or view previously-recorded content.

In the first step 302, an input screen is presented to the users via their client devices 128, 130. In the next step 304, the users are authenticated by their usernames and passwords, if not already logged-on. If the usernames and passwords are incorrect, then the users are presented with an error screen in step 306.

Once logged-on, the central qualifying system 136 determines if the users are approved for billing in step 308, in the case of a subscription-based service model. If the users are not approved for the billing, then a sales pitch screen is presented to the users in step 310, when the system is deployed with a paid-subscriber model.

In the illustrated example, a subscription-based service model is implemented. In addition to being authenticated by username and password, the users must also must provide valid billing information. In alternative embodiments, a free or advertiser sponsored service model may be implemented. In these alternative embodiments, steps 308 and 310 would not be necessary.

In the next step 312, the central qualifying system 136 determines the current locations of the users. The locations of the users are determined because the users are, in some cases restricted in the functionality that is available when they are accessing the system from a geographic position that is outside of their home market.

The locations of the users are determined by, for example, accessing a global position system on the client devices, accessing position data from cellular phone systems that are currently accessible by the client devices, or looking up the routable Internet protocol addresses currently assigned to the client devices in an address geographical location directory. The address geographical location directory maps Internet protocol addresses (IP addresses) to geographic locations around the United States. When user requests arrive at the central qualifying system 136, the IP addresses of the user requests are compared to IP addresses in the address geographical location directory. This comparison enables the central qualifying system 136 to determine the current approximate geographic location of the client devices and thus the users.

If the users are located in their home markets with reference to database 502, then the central controller 504 of the central qualifying system 136 transfers each user request to access the system to the regional systems in the home market of each user in step 314.

If the users are located in roaming areas, i.e., physically outside their home markets, then the regional systems 100-1 to 100-n in the home markets 140-1 to 140-n of the users become geographical proxies for users in step 316. In the next step 314, the central controller 504 of the central qualifying system 136 transfers the user requests to access the system to the regional systems 100-1 to 100-n in the home markets of the users.

In the next step 320, the regional system 100 accesses lists of regional content within the home markets of the users. In the next step 322, the users are able to select what content type they wish to access. Each user is provided with their own individual account through which they access any live content streaming or set up future recordings to be associated with the user's account. Likewise, playback of previously-recorded content is done from the user's account and only content associated with the user's account is generally accessible by the user.

If the user selects live streaming content, then the user is presented with the live stream screen in step 326. If the user selects content that the user previously recorded, then the user is presented with the pre-recorded screen in step 328. If the user selects future recording, then the user is presented with the future recording screen to set up a future recording in step 324. Alternatively, these screens are displayed with a single interface. The single interface presents a program guide of the live content currently available and/or available in the near future. The user is then able to select content from the program guide to schedule a future recording or to view live streaming content. Additionally, users are also presented with a list of their previously-recorded content.

Once users select previously-recorded content or live streaming content, the regional system 100 streams the selected content through the Internet to the users in step 330 at their current location.

In an alternative embodiment, the user request to access the system is first received by a local regional system in the market that the user is currently located. In this case, each regional system maintains a list (or record) of all the users of that home market or possibly a list of all users of the entire system 101. If the user is accessing the regional system in their home market, then the regional system recognizes and authenticates the user. The regional system then handles the user request in the same way as if the request had been transferred from the central qualifying system 136.

If user is in a roaming market, then the local regional system may not recognize or authenticate the user. The user request is instead transferred to the central qualifying system 136, which stores records of all users in the central qualifying system database 502 or the regional system within the roaming user's home market.

Figure 4B:
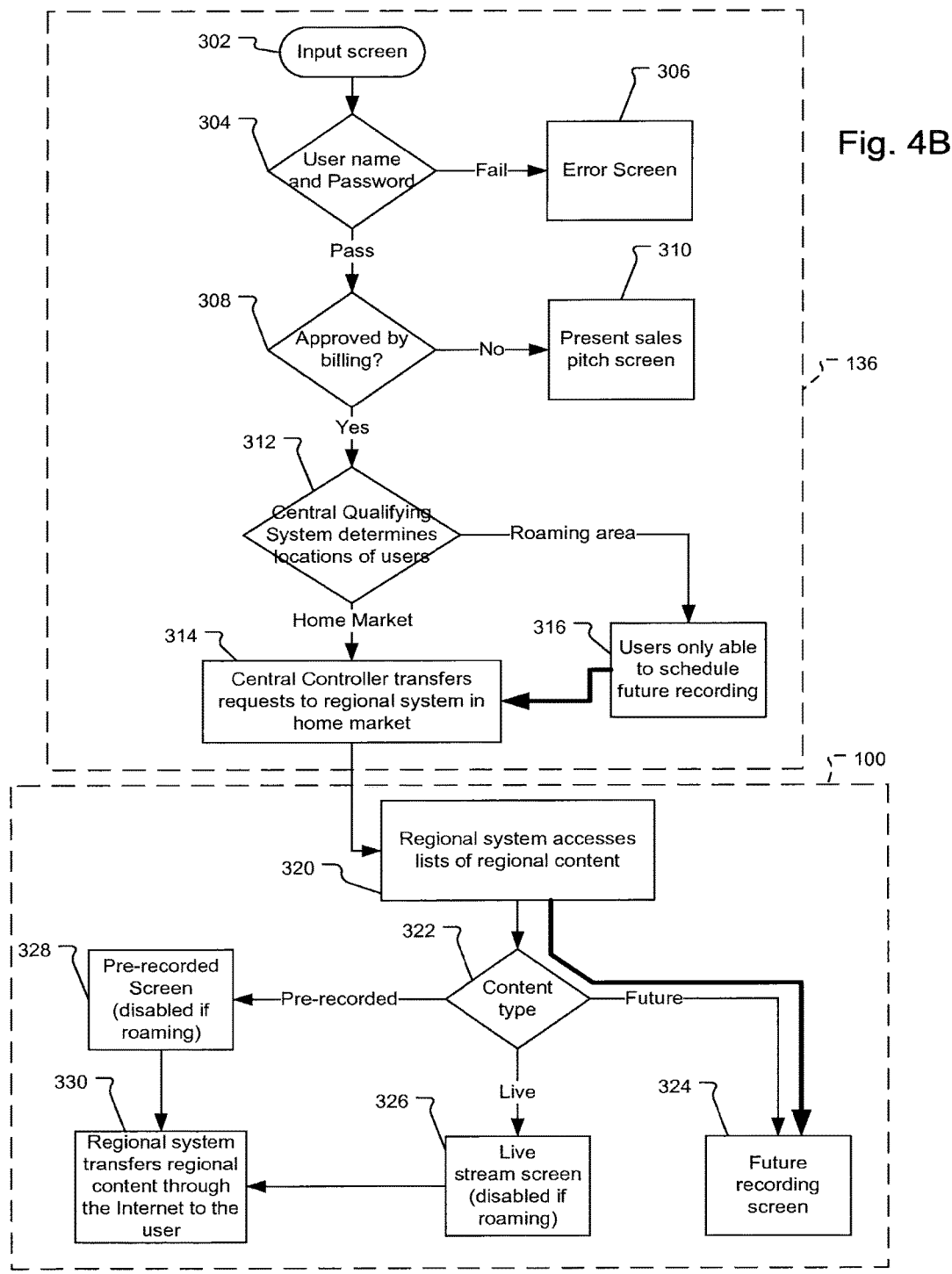
FIG. 4B is a flow diagram illustrating an alternative embodiment of the steps performed by the central qualifying system and regional systems to enable users to possibly view live streaming content, set up a future recording, or possibly view previously-recorded content.

FIG. 4B is a flow diagram illustrating an alternative embodiment of the steps performed by the central qualifying system and regional systems to enable users to view live streaming content, set up a future recording, or view previously-recorded content.

In the illustrated embodiment, nearly all the steps are identical as the steps described with reference to FIG. 4A. However, if the users are in roaming areas (step 312), then the functionally of the regional system 100 is restricted to only allow the roaming users to schedule a future recordings when transferred to the regional systems 100-1 to 100-n in step 316. The regional system still provides lists of regional content in step 320, but the users are only access to schedule future recordings (step 324). The ability to view live streaming content and previously-recorded content is disabled until the users are in their home markets.

Figure 4C:
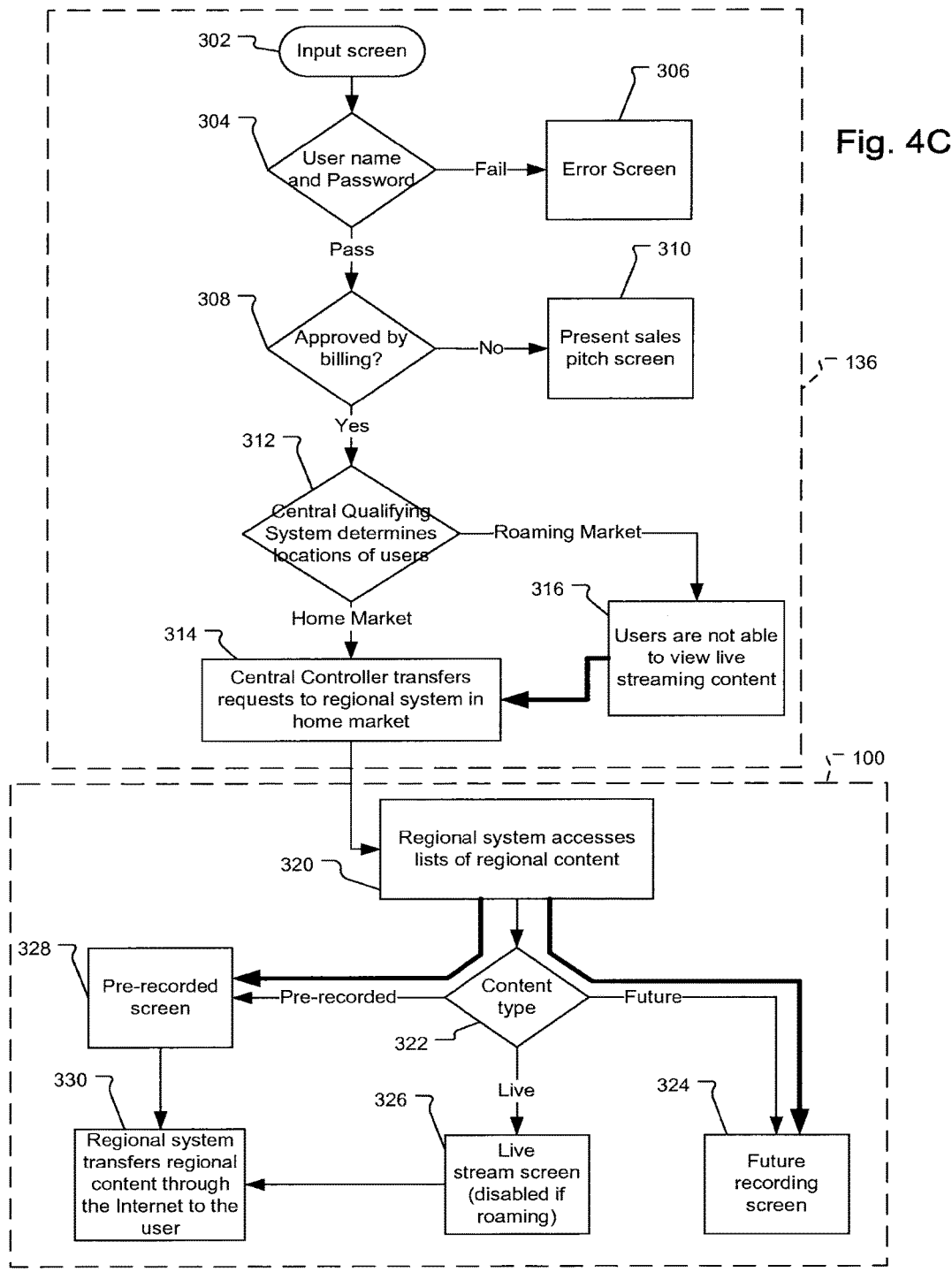
FIG. 4C is a flow diagram illustrating still an alternative embodiment of the steps performed by the central qualifying system and regional systems to enable users to possibly view live streaming content, set up a future recording, or view previously-recorded content.

FIG. 4C is a flow diagram illustrating an another alternative embodiment of the steps performed by the central qualifying system and regional systems to enable users to view live streaming content, set up a future recording, or view previously-recorded content.

In the illustrated embodiment, nearly all the steps are identical as the steps described in FIG. 4A. However, if the users are in roaming are (step 312), then the functionally of the regional system 100 is restricted to only allow the roaming users to schedule future recordings and view previously-recorded content in step 316. The ability to view live streaming content is disabled until the users are within their home markets.

Figure 5:
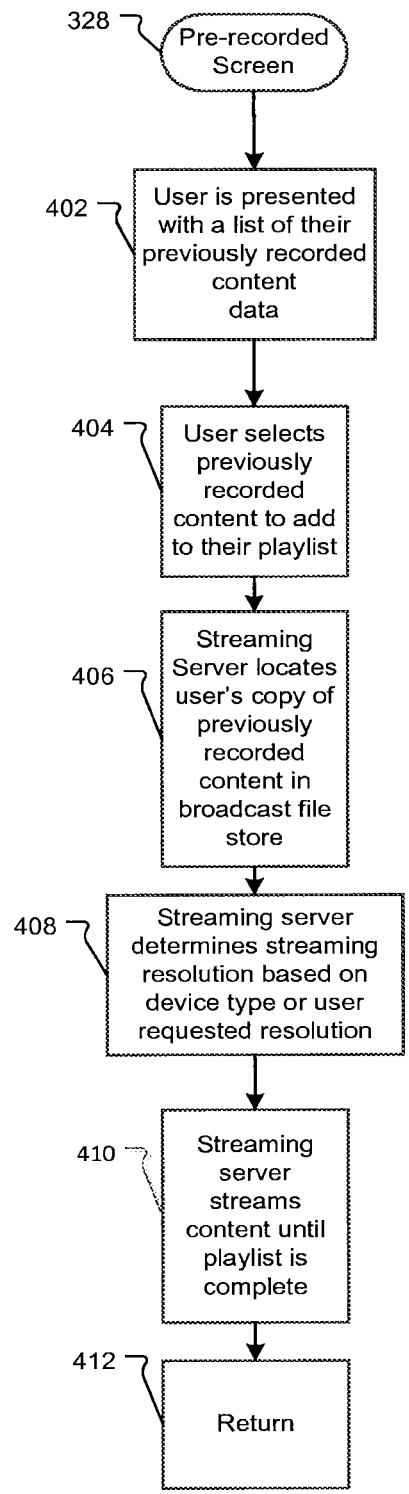
FIG. 5 is flow diagram illustrating the steps for the regional systems to provide previously-recorded content transmissions to the users.

FIG. 5 is flow diagram illustrating the steps for the regional system 100-1 to 100-n to provide previously-recorded content transmission from the streaming server 120.

The users begin at the pre-recording screen that is served to the user devices from the application web server 124 in step 328. This is often a web page. In other examples, a propriety interface is used between the application web server 124 and an application program running on the user devices.

In the first step 402, the users are presented with a list of their previously-recorded content data. Users are only able to see the content data, e.g., a television program, that they instructed the regional system 100-1 to 100-n to record. In some examples, the application server 124 suggests over the air content that the users might be interested in watching or recording. Nevertheless, the users must initiate the requests to record and save the broadcast content.

In the next step 404, the user selects previously-recorded content data to add to a playlist. The streaming server 120 locates the user's possibly unique copy of the previously-recorded content data in step 406 in the broadcast file store 126. In the next step 408, the streaming server 120 determines the resolution that will be presented to the user based on the user's device. In alternative embodiments, users are able to select the resolution regardless of device. In another alternative embodiment, the client device automatically selects the highest resolution that the communications path can reliably provide.

In the next step 410, the streaming server 120 streams the content data or recorded television program in the playlist to the user's device until the user's playlist is complete.

FIG. 6 illustrates the database architecture for storing content data from content transmissions in the broadcast file store 126.

In the illustrated example, each record includes information that identifies the user and the transcoded content data. For example, a user identification field (USER ID) uniquely identifies each user and/or their individual user account. Additionally, every captured content transmission is associated with the user that requested it. The content identification field (CONTENT ID) identifies the title (or name) of the content transmission. Generally, the content name is the title of the television program, television show or movie, that is or was being recorded or streamed live. An antenna identification field (ANTENNA ID) identifies the specific antenna element that was assigned and then used to capture the content transmission. A network identification field (NETWORK ID) specifies the broadcasting entity or network that broadcast the content transmission. The video file field (VIDEO FILE) contains the content data or typically a pointer to the location of this data. The pointer specifies the storage location(s) of the high, medium, and low quality content data. A file identification field (FILE ID) further identifies the unique episode, movie, or news broadcast. Lastly, a time and date identification field (TIME/DATE) stores the time and date when the content transmission was captured. In alternative embodiments, records in the broadcast file store 126 could include greater or fewer fields.

By way of an example, User 1 and User 2 both have unique USER ID's and both have their individual copies of the content transmission. Likewise, both users have their own copy of the same content transmission even though both users requested the same content transmission, at the same time and date, and on the same broadcast network. User 1 is only able to view their copy of content data stored to their USER ID and User 2 is only able to view their copy of the content data stored to their USER ID. Additionally, the unique antenna element that was assigned to each user is also recorded in the ANTENNA ID field.

Figure 7:
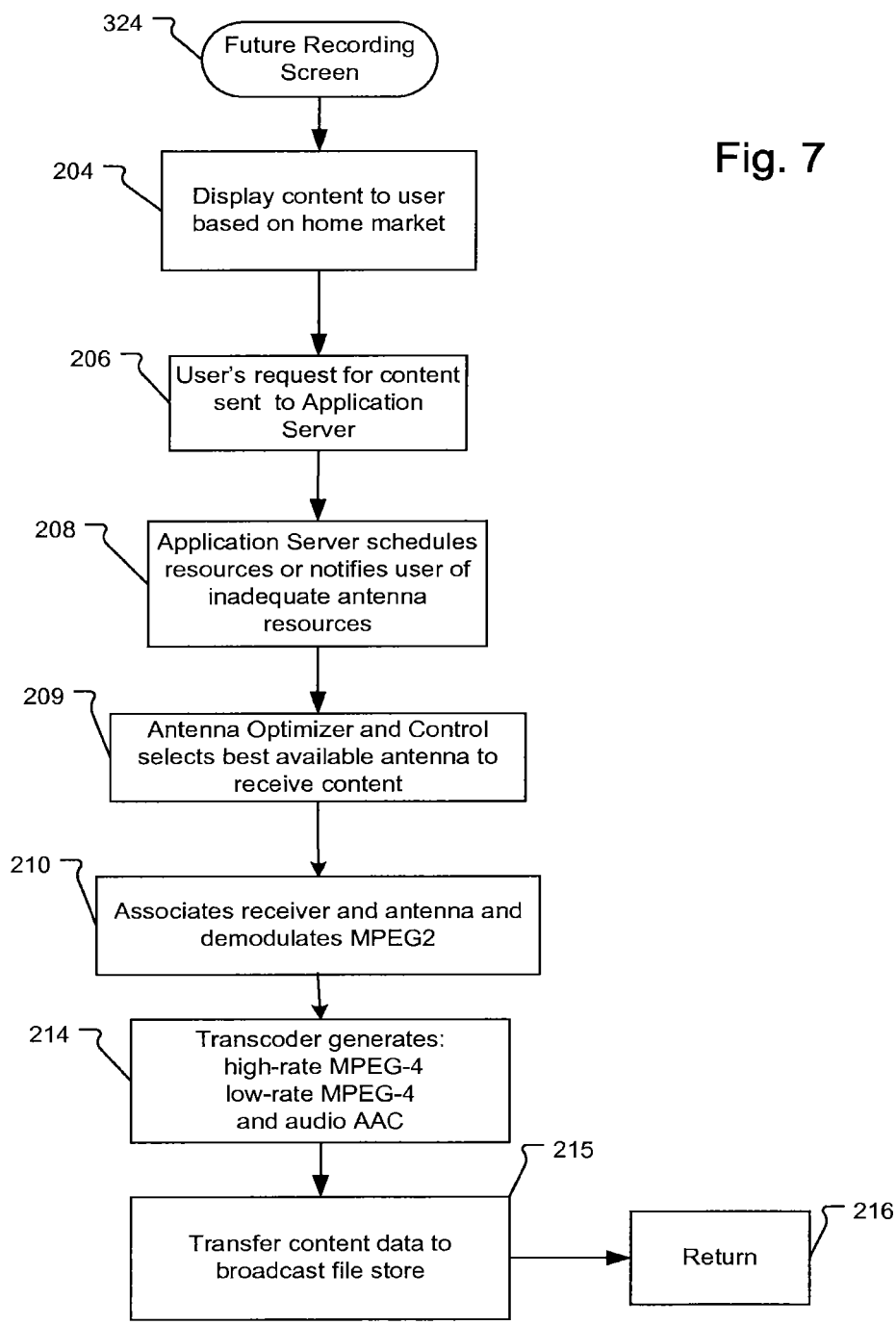
FIG. 7 is flow diagram illustrating the steps for the regional system to schedule a future recording for an over the air broadcast content transmission.

FIG. 7 is flow diagram illustrating the steps for the regional system to schedule a future recording of an over the air broadcast content transmission.

The users begin at the future recording screen that is served to the user device from the application web server 124 in step 324. In the first step 204, the application server 124 determines and displays available content to the user based on the user's home market to enable localization. Typically, the user is presented with a list of available television networks, current broadcasts, and times and dates of future broadcasts.

In the next step 206, the user's request for content is sent to the application server 124. The application server 124 then schedules resources to be available at the time of the content broadcast or notifies the user that resources are currently unavailable in step 208. Then the application server 124 directs the antenna optimize and control system 116 to allocate the best available antenna element at the time and date of the desired content broadcast in step 209. In the case where a user's antenna is assigned permanently this step is skipped, however. In the next step 210, the antenna optimize and control system 116 associates the antenna and receiver, and demodulates the broadcast content into MPEG-2 format.

The regional systems 100-1 to 100-*n* enable each user to separately schedule future recordings of broadcast content. Additionally, each user is allocated an individual antenna to receive that broadcast content. Further, and generally, the application server 124 schedules recordings based on each users' command so that there is always the same number of recordings as scheduled requests. This applies even when two users request recordings of the exact same content transmission; the system captures and stores separate content transmissions for each user individually so that each user has their own unique copy in the file store 126 that was generated from a separate antenna element.

In the next step 214, the encoder 103 generates both a high rate/resolution and low rate/resolution video stream of transcoded content transmission data. In a current embodiment, the transcoded content data are encoded into the MPEG-4 format and the audio is transcoded into AAC (advanced audio coding) format.

The transcoded content data are then transferred to the broadcast file store 126 in step 215 along with time index information at both the high rate/resolution and low rate/ resolution video content data.

In an alternative embodiment, the encoder 103 generates a tri-rate output. Generally, the tri-rate includes high, medium, and low rate/resolution outputs of the transcoded content data. Still other embodiments could have greater or fewer output rates. The different output rates/resolutions enable the regional systems 100-1 to 100-*n* to provide different quality video streams based on factors such as the network capabilities, the user device, and user selection, to list a few examples.

Figure 8:
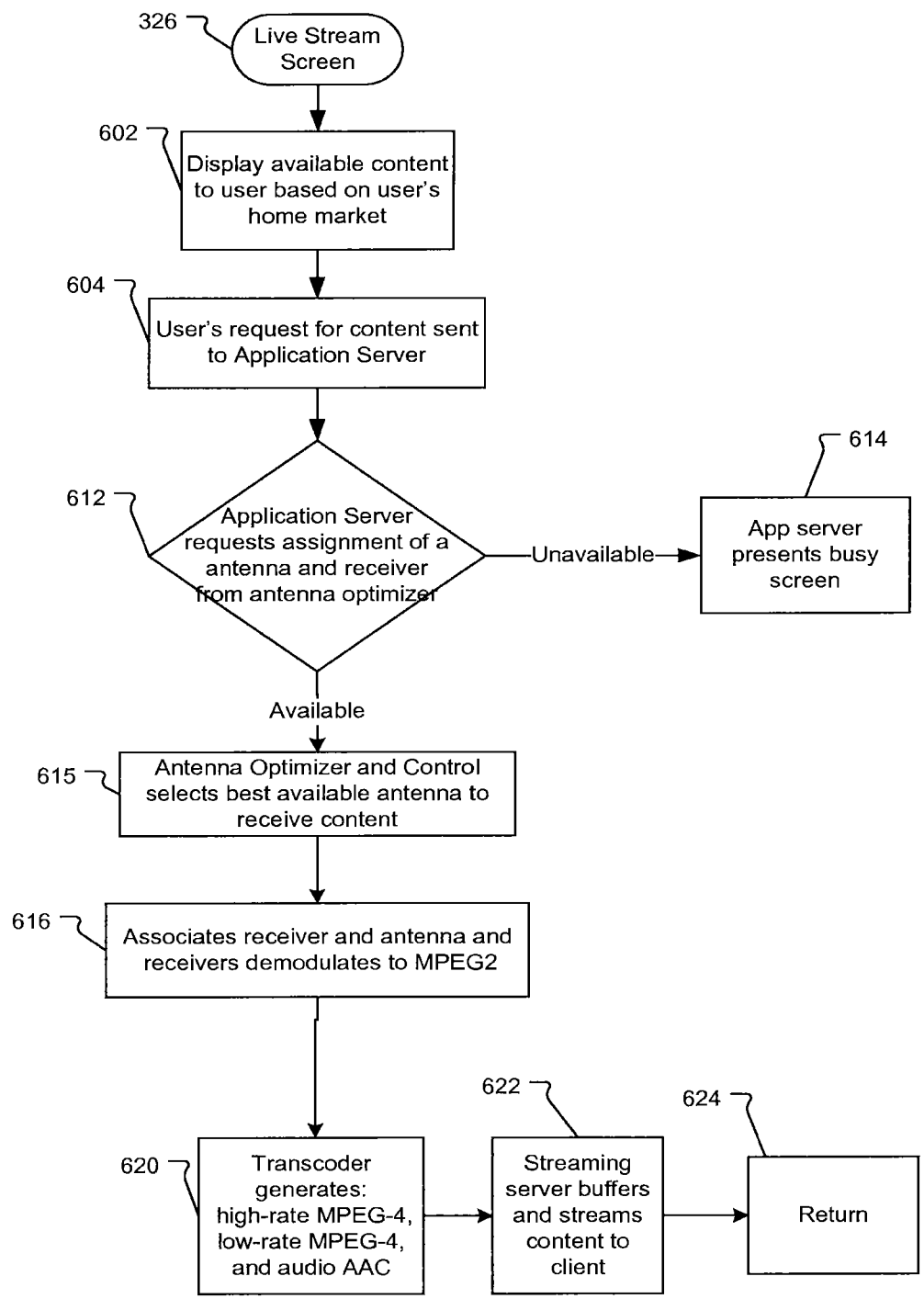
FIG. 8 is a flow diagram illustrating the steps for the regional systems to enable users to watch streams of content data on the client devices in real time.

FIG. 8 is a flow diagram illustrating the steps for the regional systems 100-1 to 100-*n* to enable users to watch streams of content data on devices in real time.

Each of the users begins at the live stream screen 326 that is served to the user devices from the application web server 124. Based on the user's home market of the individual user, a list of available over the air broadcasts of television programs is provided in step 602. Additionally, the broadcast time and date are also displayed to the users. Each of the users is able to select content to view and the user's requests for content are sent to the application server 124 in step 604. The application server 124 requests assignment of an antenna element from the antenna optimize and control system 116 in step 612 of each of the users.

If the antenna and/or tuner are not available, then the application server 124 returns a busy screen to the users in step 614. If antennas are available, then the antenna optimization and controller 116 selects the best available antenna to receive the over the air broadcasts in step 615 for each of the users' requests.

After an antenna is selected and the over the air broadcast is received, it is processed by the encoder system 103. The content transmission is decoded into MPEG-2 format in step 616. In the next step 620, the encoder 103 generate both a hi-rate and low rate MPEG-4, in one example, and the audio is transcoded into AAC (advanced audio coding) format. The transcoded broadcast content data into the broadcast file store 126 along with time index information.

Next, the streaming server 120 buffers and streams the broadcast content data from the broadcast file store 126 to the users devices for the duration of the broadest in step 622.

Figure 9:
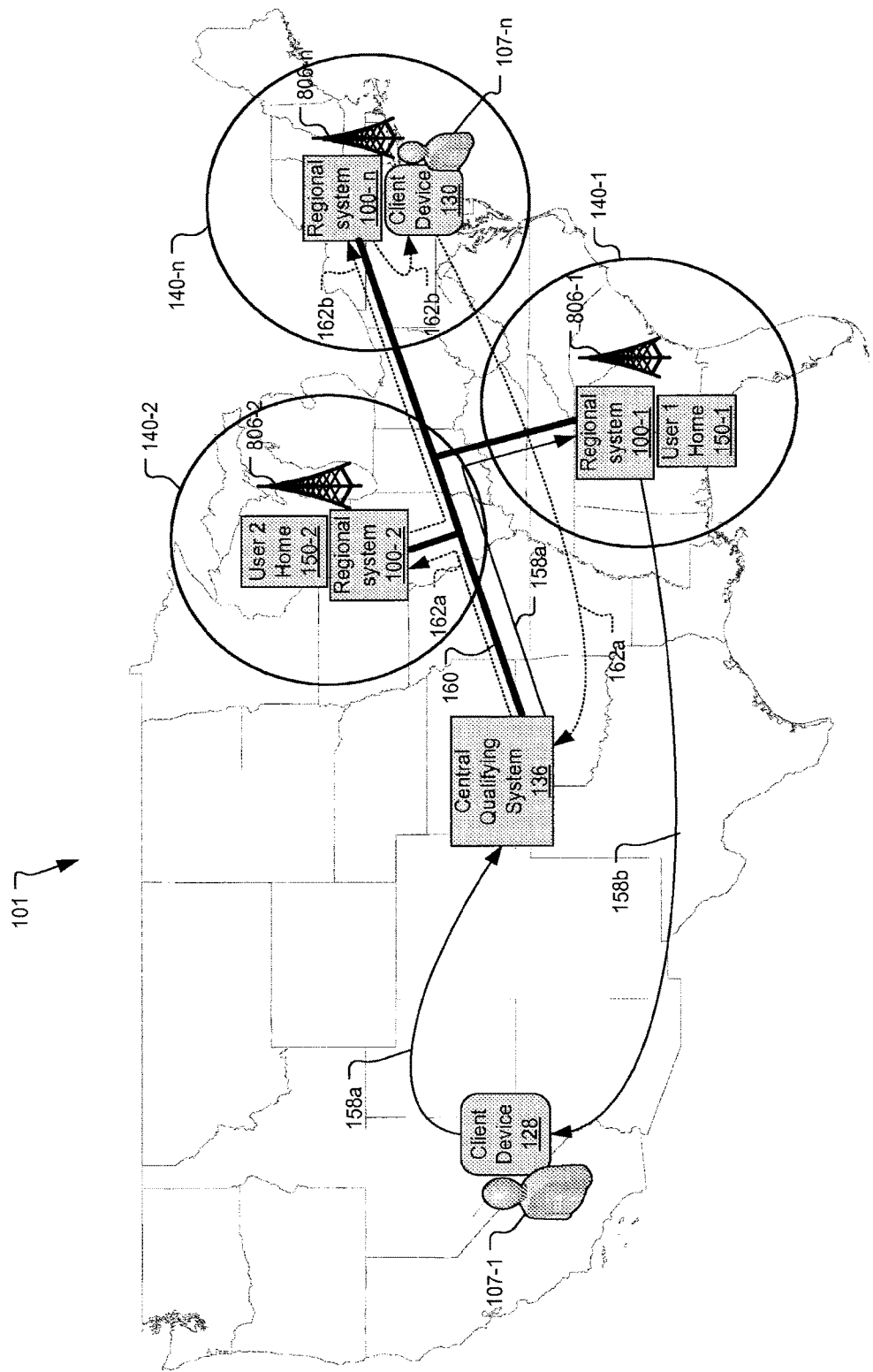
FIG. 9 is a schematic diagram illustrating an alternative embodiment of the national system where the regional systems operate as nodes of a content delivery network.

FIG. 9 is a block diagram illustrating an alternative embodiment of the national system 101 where the regional systems 100-1 to 100-*n* operate as nodes of a content delivery network.

In the illustrated example, the regional systems 100-1 to 100-*n* are connected with dedicated links 160 (also known as leased lines or private lines). The dedicated links are telecommunications lines that only carry network traffic of a single business or company or have a specific guaranteed bandwidth. This typically results in faster and more consistent data transfer speeds.

By way of example, a first user 107-1 is currently outside all of the markets 140-1 to 140-*n*. The first user's request 158*a* is sent via the Internet to the central qualifying system 136. The central qualifying system 136 transfers the user request 158*a* to the regional system 100-1 in the home market 140-1 of the user 107-1 via the dedicated links 160. The regional system 100-1 in the home market of the first user 107-1 captures and encodes the requested broadcast content. The encoded content transmission 158*b* is then streamed as content data to the client device 128 of the user 107-1 via the Internet.

A second user 107-2 is temporarily located in a roaming area, but is still within a market serviced by regional system 100-*n*. In this scenario, the user request 162*a* is transferred via the Internet to the central qualifying system 136. The central qualifying system 136 transfers the user request 162*a* to the regional system 100-2 in the user's home market 140-2 via the dedicated links 160. The regional system 100-2 in the home market of the second user captures and encodes the requested content. The encoded transmission 162*b* is then transferred via the dedicated links 160 to the local regional system 100-*n* in the market 140-*n* in which the second user 107-2 is temporarily located. The content transmission 162*b* is then streamed as content data to the client device 130 of the second user 107-2 by regional system 100-*n*.

Figure 10:
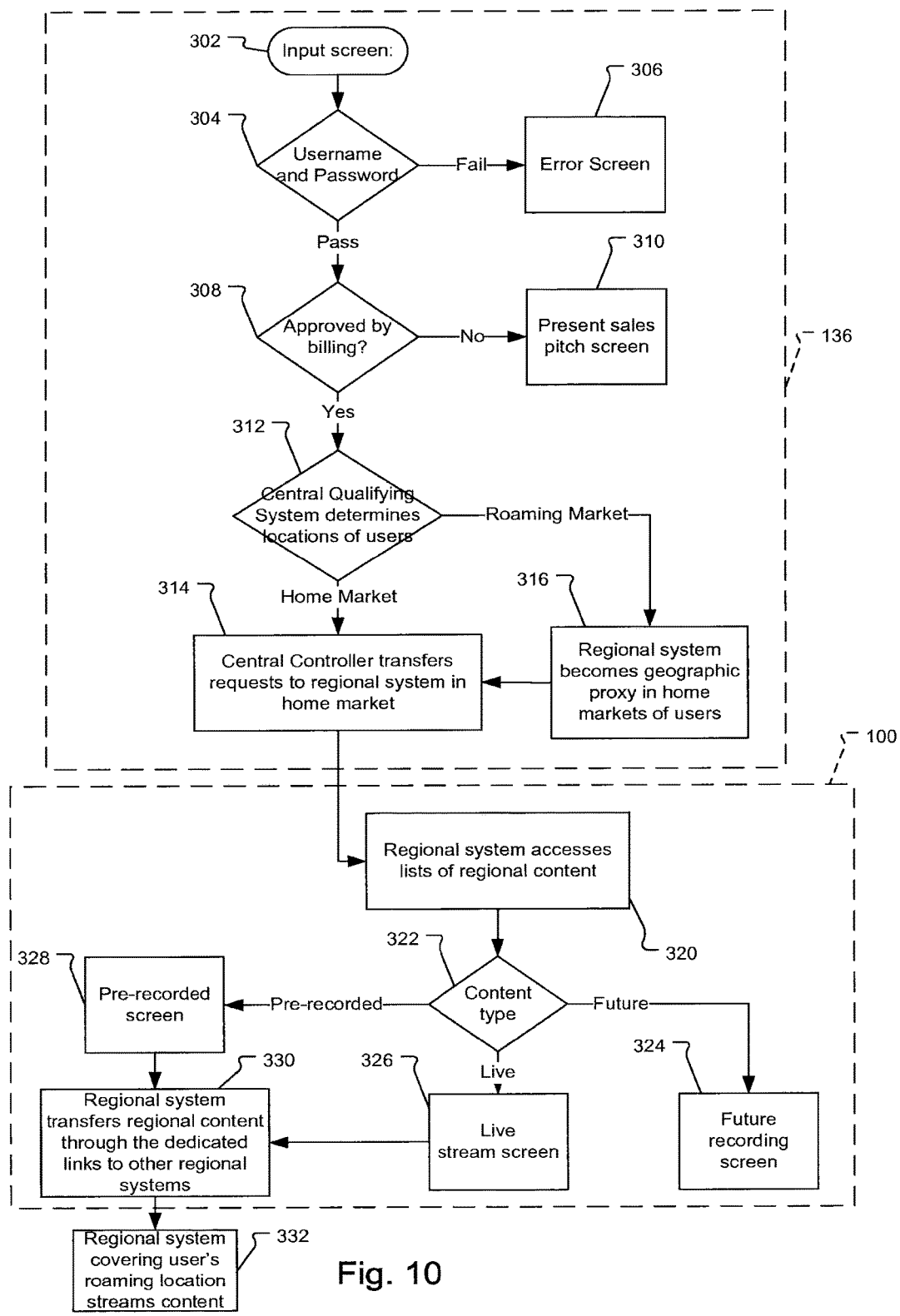
FIG. 10 is a flow diagram illustrating the steps for the central qualifying system and regional systems to enable users to view live streaming content, set up a future recording, or view previously-recorded content when the regional systems operate as nodes of a content delivery network.

FIG. 10 is a flow chart illustrating an alternative embodiment of the steps performed by the central qualifying system 136 and regional systems 100-1 to 100-*n* when operating as nodes of a content delivery network.

In the illustrated embodiment, steps 302 through 328 are identical to the steps described in FIG. 4A. However, in the step 330, the regional system 100 transfers regional content through the dedicated links 160 to the other regional systems located in the same market as that in which the user is temporarily located. In the next step 332, the regional system in the roaming market where the user is temporarily located streams the requested content transmission via the Internet to the user.

In the foregoing description, the central qualifying system 136 is shown as being separate from each of the regional systems 100 for the purposes of describing the respective functionality of the systems. In some embodiments, the systems are in fact separate from each other. In other embodiments, however, one of the regional systems 100 performs the role and functions of the central qualifying system 136 and in effect functions as a master with the other regional system being slaves. In still other embodiments, the role and functions of the central qualifying system 136 are performed in distributed fashion by the regional systems that are peers to each other.

While this invention has been particularly shown and described with references to preferred embodiments thereof, it will be understood by those skilled in the art that various changes in form and details may be made therein without departing from the scope of the invention encompassed by the appended claims.

What is claimed is:

1. A national system for streaming content to a user, the national system comprising:
    regional systems for capturing and distributing requested broadcast television content transmissions to the user from the home markets associated with each of the regional systems, wherein each of the regional capture and distribution systems comprises an array of antennas, with each of the antennas being able to capture broadcast television content transmissions from television broadcasting entities located within the respective market of that regional capture and distribution system, wherein the regional capture and distribution systems transcode and store an individual copy of the broadcast television content transmissions for the user with the regional capture and distribution systems transferring the individual copy of the requested transcoded content transmissions to the user, wherein the regional systems capture the content transmissions with antennas that are uniquely assigned to the user; and
    a qualifying system that determines geographical locations of the user by accessing a global position system, accessing cellular phone systems, or looking up Internet protocol addresses assigned to the user in an address geographical location directory and determines the home market for the user, in response to determining that the geographic location of the user is located outside of a geographic region of the user's respective home market, the qualifying system then passes the user to the regional systems covering the home market of the user and restricts access of the user only to the regional systems located within the respective home markets of the user.

2. The system according to claim 1, wherein the regional systems transfer the requested broadcast television content transmissions to the users via Internet streaming.

3. The system according to claim 1, wherein the qualifying system determines the home market of the user based on account information associated with the user.

4. The system according to claim 1, wherein the qualifying system determines the home market of the user based user selections.

5. The system according to claim 1, further comprising broadcasting entities that broadcast over the air broadcasts that are captured and encoded by the regional systems.

6. The system according to claim 5, wherein the broadcasting entities are television networks transmitting over the air broadcasts.

7. The system according to claim 1, wherein the regional systems are geographical proxies in the respective home markets of the users.

8. The system according to claim 1, wherein the regional systems are nodes of a content delivery network.

9. The system according to claim 8, further comprising dedicated links that connect the regional systems and transfer data between the regional systems.

10. The system according to claim 9, wherein the dedicated links transfer the user requested content transmissions to local regional systems and the local regional systems then stream the user requested content transmission to the users via the Internet streaming.

* * * * *